US005205436A

United States Patent [19]

Savage

[11] Patent Number: 5,205,436

[45] Date of Patent: Apr. 27, 1993

[54] MAINE TOOL DISPENSING DEVICE AND SYSTEM

[75] Inventor: Kent V. Savage, Morrow, Ohio

[73] Assignee: Electronic Merchandising Systems, Inc., Cincinnati, Ohio

[21] Appl. No.: 788,336

[22] Filed: Nov. 6, 1991

[51] Int. Cl.[5] .......................... G06F 7/00; B65G 49/00

[52] U.S. Cl. ............................................ 221/7; 221/1; 221/75; 221/102; 221/129; 364/479

[58] Field of Search ......................... 221/1, 2, 7, 8, 13, 221/75, 76, 77, 102, 129, 131; 194/904; 186/55, 56; 364/479

[56] References Cited

U.S. PATENT DOCUMENTS

| | | | |
|---|---|---|---|
| 3,491,870 | 1/1970 | Isserstedt . | |
| 4,046,243 | 9/1977 | Valentine | 221/102 |
| 4,276,384 | 6/1981 | Hicks et al. . | |
| 4,288,780 | 9/1981 | Theodoru et al. . | |
| 4,519,522 | 5/1985 | McElwee . | |
| 4,549,170 | 10/1985 | Serres et al. . | |
| 4,564,102 | 1/1986 | Mori et al. . | |
| 4,575,719 | 3/1986 | Bertagna et al. . | |
| 4,598,810 | 7/1986 | Shore et al. . | |
| 4,635,053 | 1/1987 | Banks et al. . | |
| 4,650,977 | 3/1987 | Couch . | |
| 4,757,915 | 7/1988 | Albright et al. | 221/75 |
| 4,785,969 | 11/1988 | McLaughlin . | |
| 4,814,592 | 3/1989 | Bradt et al. . | |
| 4,847,764 | 7/1989 | Halvorson . | |
| 4,896,791 | 1/1990 | Smith | 221/8 |
| 4,961,507 | 10/1990 | Higgins | 221/129 |

FOREIGN PATENT DOCUMENTS 258668 3/1988 European Pat. Off. .............. 221/75

OTHER PUBLICATIONS

Service Manual for Model 3007 Cold Food Merchandiser Jan. 1990.

Parts Manual For Model 3007 Cold Food Merchandiser Jan. 1990.

Parts Manual for Glassfront Merchandiser (III Series) Jun. 1990.

*Primary Examiner*—H. Grant Skaggs

*Attorney, Agent, or Firm*—Killworth, Gottman, Hagan & Schaeff

[57] ABSTRACT

A system is provided for automatically dispensing machine tools, kits of tools and related supplies. The system includes one or more automatic tool dispensers interconnected and controlled by a host computer. Automatic tool dispensers may be placed at various locations about manufacturing and other facilities to provide decentralized distribution of reusable and perishable tools and supplies near work stations, providing constant, but controlled, access to tools. Data entry device are used to operate the automatic tool dispensers. Indicia may be entered to selectively operate the automatic tool dispensers to dispense a tool, or a plurality of tools as a kit. The data entry devices also provide data which can assist in inventory control, tracking and tool usage. Tool delivery system are provided in the automatic tool dispenser including adjustable helical coil delivery devices and robotic delivery systems. Tool return devices are also provided which permit reuse of used tools, recycling of worn-out tools, and additional data regarding use.

33 Claims, 6 Drawing Sheets

MAINE TOOL DISPENSING DEVICE AND SYSTEM

BACKGROUND OF THE INVENTION

The present invention relates to an apparatus and system for automatically dispensing machine tools, and in particular, to a secure, automatic tool dispenser and related computer system for controlling, dispensing and tracking tools which are dispensed.

Presently it is a common practice in manufacturing facilities for tools to be dispensed from one or several locations in a facility. Use of perishable tools, such as drill bits, cutting blades, machine tools and the like, requires repeated trips to tool stockrooms. In addition, related perishable supplies often must be obtained from material stockrooms which are at another location Stockroom employees may be delayed by demands from several individuals, may be occupied with other duties, or may be temporarily indisposed. These practices increase set-up time, labor costs, and overall manufacturing costs. Delays due to tight controls can encourage the continued use of worn or outdated tools, slowing production and increasing costs. However, where access to perishable tools and related supplies is loosely controlled, pilfering and loss through inattention to tracking increase In either case, whether centralized distribution is undertaken, or access is loosely controlled, inventory control, usage rates, and tracking of new and used perishable and reusable tools and supplies continues to be time-consuming and problematic.

Secured dispensing machines have been developed for a variety of articles, such as money, beverages, canned and packaged foods, drugs, keys and video tapes. For example, Isserstedt, U.S. Pat. No. 3,491,870 discloses a system for simultaneously dispensing multiple grocery items, and includes various control features such as invoice control, security control and dispenser control. Banks et al, U.S. Pat. No. 4,635,053 disclose a system for supervising access to a plurality individual items, such as vehicle ignition keys. Shore et al, U.S. Pat. No. 4,598,810, discloses an apparatus for dispensing and returning video cassettes with an identification card. Such dispensing machines, however, have heretofore been unsuitable, and insufficiently adapted to satisfy the demands associated with the dispensing of tools and related items used in industrial environments.

Accordingly, while dispensers have long been known for various articles such as money, beverages, and foodstuffs, the need exists for an economical and efficient means for dispensing and tracking tools used in manufacturing facilities and thereby reduce costs and improve productivity.

SUMMARY OF THE INVENTION

The present invention satisfies that need by providing a system for automatically dispensing machine tools, kits of tools and related supplies. The system may comprise one or more automatic tool dispensers which are interconnected and controlled by a host computer The automatic tool dispensers may be placed at various locations about manufacturing facilities to provide decentralized distribution to satisfy the need for reusable and perishable tools and supplies near work stations Constant, but controlled, access to tools results, reducing set-up time and lowering labor costs. For simplicity, reference to tools or kits, hereafter, will include reference to related supplies dispensable separately or therewith.

Each of the automatic tool dispensers in the system of the present invention includes a housing with means for delivering tools disposed therein. In accordance with the present invention the means for delivering tools can be adapted, manually or electronically, to permit the automatic tool dispenser to automatically dispense a kit of tools to the user. The dispensing of kits reduces the user's set-up time for a particular operation by automatically providing all the tools which will be needed for the operation.

The means for delivering tools may be of several types. Helical coil delivery devices are provided in which helical coils rotate to deliver tools to a point of delivery near a delivery aperture. Preferably, a plurality of helical coils are removably disposed side by side on drawers, where the separation between helical coils can be varied by removing intermediate coils. The helical coils may also have different diameter loops. The helical coil delivery devices are thereby adjustable to receive tools of different sizes. Further, a plurality of such drawers are slidably inserted on supports into the housing. The spacing between the drawers may also be varied to adjust the means for delivering to accommodate tools of various sizes. The means for delivering may also include a robotic delivery system. A robotic delivery system is provided for tools whose size or shape is beyond the limits of helical coil delivery devices, or which require delivery without dropping A plurality of trays are provided which rotate in a loop to present the tools or kits disposed thereon to a delivery aperture.

In addition to the host computer, the means for controlling the automatic tool dispenser further includes user means for entering data to select individual tools desired by the user. The automatic tool dispensers are operable by entering user identifying indicia, security codes, or indicia related to tools, kits of tools, or operations performed therewith. The host computer can receive, process and store the indicia entered at each automatic tool dispenser to control the operation thereof and produce data which may be used for tracking, inventory and improved distribution. Various security features can be used to lock out the system from unauthorized users or restrict distribution to authorized users. Delivery of tools can be keyed to user identification or security codes, or can be limited by other data, such as the operation to be performed, prior usage by the particular user, or inventory levels desired for use by later shifts. Thus, while the present invention permits constant access to tools at decentralized locations, centralized control is maintained. Security and accountability are enhanced. Tracking reduces pilferage. As well, old, obsolete tools can be retired more easily, and new tools and methods introduced through the machines to identified users. Data on use permits improved inventory and distribution practices which further reduce manufacturing costs.

The automatic tool dispenser is adaptable to include add-on modules which are operable from the user means located on the primary dispenser. Thus, any automatic tool dispenser may be increased in capacity to supply a greater variety or number of tools, as required to satisfy the tool needs for a particular location or operation. In addition, the automatic tool dispensers may include means for receiving used tools, accessible by user means for entering data. Used or worn-out tools returned thereto enhances the tracking and control of tools, permits recycling of worn-out tools, and re-use of used tools by others, further reducing manufacturing costs.

Accordingly, it is an object of the present invention to provide a system and apparatus for automatically dispensing tools, kits of tools, and related supplies to a user from an automatic tool dispenser.

It is a further object of the present invention to provide tools as a kit by entry of a single selection at the automatic tool dispenser.

It is further object of the present invention to deliver tools to a user, individually or in kit form, without dropping those tools.

It is a further object of the present invention to provide a user-friendly system for automatically dispensing tools to a user.

It is a further object of the present invention to provide a secure means to dispense tools to users in a manufacturing or other facility which provides constant, but secure, access to tools.

It is a further object of the present invention to provide a system for dispensing tools which permits varying levels of security to be exercised over the dispensing of tools.

It is a further object of the present invention to provide a system for dispensing tools which, in operation, produces data which may be used for inventory, tracking, accounting, planning and other business purposes.

It is a further object of the present invention to provide a system for dispensing tools which also includes means for returning tools thereto.

DETAILED DESCRIPTION OF THE PREFERRED EMBODIMENTS

Figure 1:
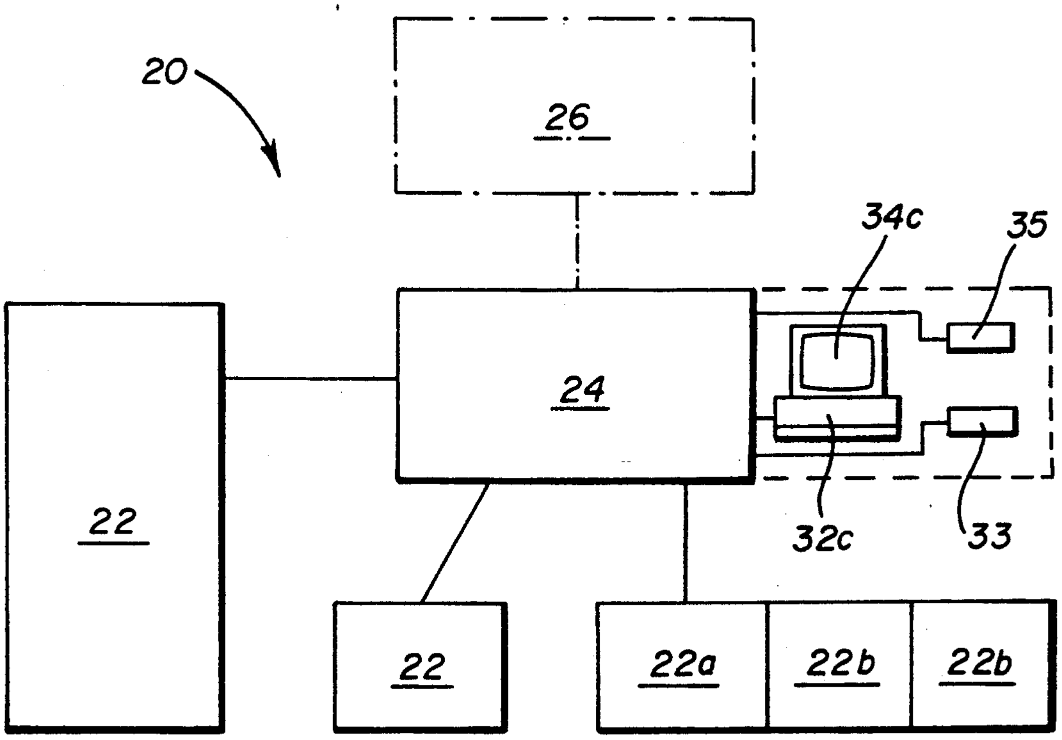
FIG. 1 is a schematic diagram of the system for dispensing tools of the present invention.

Referring to FIG. 1, the system 20 of the present invention is schematically shown including a plurality of automatic tool dispensers 22 which automatically dispense machine tools, tools, kits of tools, and related supplies. The system may be used to dispense tools in a variety of environments for a wide variety of applications including industrial, manufacturing, construction, maintenance or like operations. The system 20 may include one or more automatic tool dispensers 22. Means for controlling the delivery of tools, kits and supplies by the automatic tool dispensers includes processor means 24, such as a host computer, and/or a microprocessor. Processor means 24, for example, may be an IBM compatible personal computer, and include a keyboard 32*c*, a display monitor 34*c*, a printer 33 and a modem 35. As shown, the processor means 24 is connected to the automatic tool dispensers 22, and may also be connected to an existing customer system computer 26, shown in phantom. The automatic tool dispensers 22 may be placed at various locations about manufacturing facilities to provide decentralized distribution to satisfy the need for reusable and perishable tools and supplies near work stations. Reference to tools or kits, hereafter, will include reference to related supplies dispensable therewith.

Figure 2:
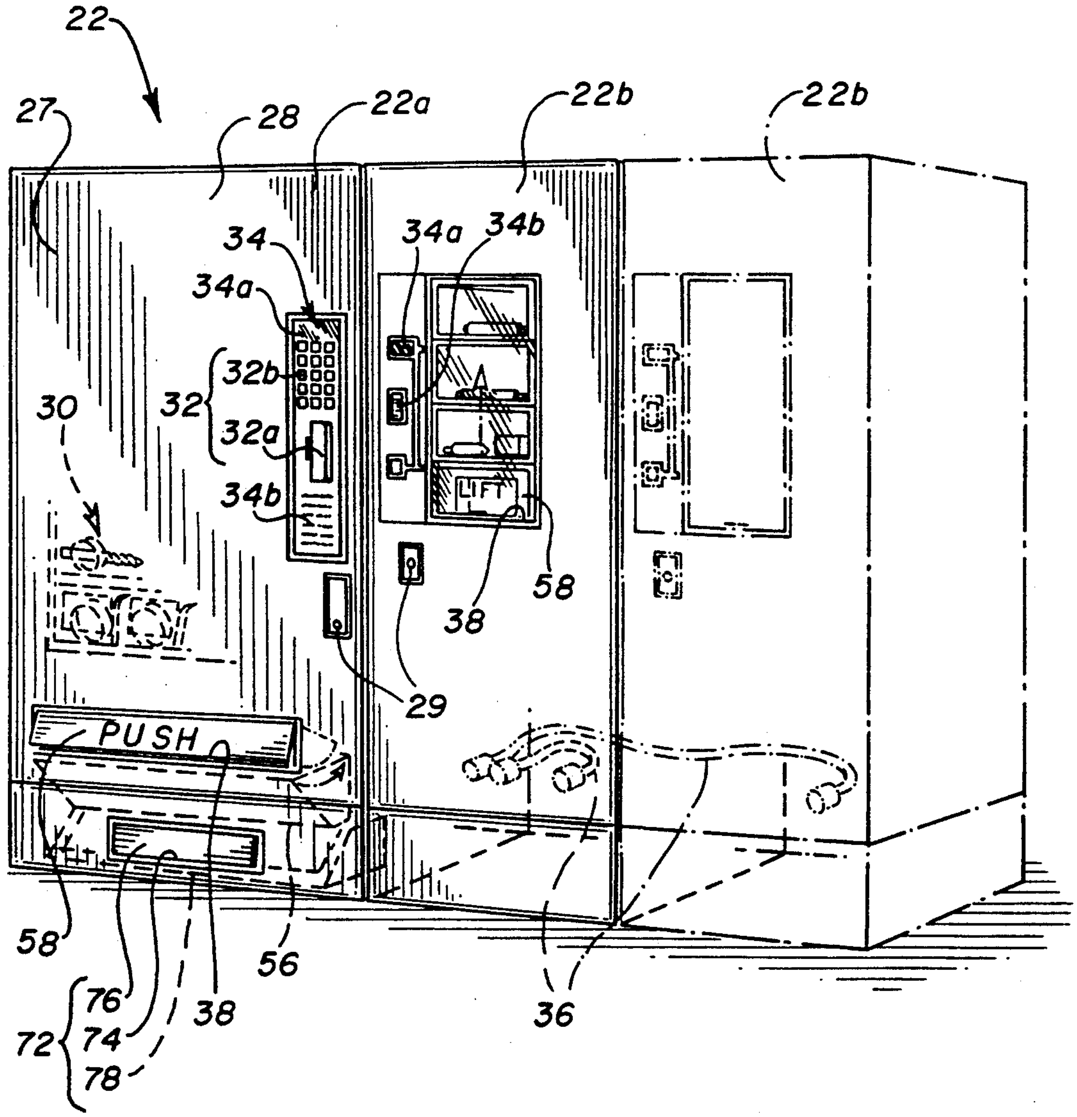
FIG. 2 is a schematic perspective view of the automatic tool dispenser of the present invention, including addon modules.

FIG. 2 shows the preferred automatic tool dispenser 22 of the present invention. The automatic tool dispenser 22 of the present invention includes a housing 28 and means for delivering 30 tools disposed therein. In accordance with the present invention the means for delivering 30 tools can be adapted, manually or electronically, to permit the automatic tool dispenser 22 to automatically dispense a kit of tools to the user which provides all the tools which will be needed for a particular operation.

Still referring to FIG. 2, in accordance with the present invention the means for controlling the delivery of tools and kits also includes user means for entering data which are disposed, at least in part, in or on the housing 28. As shown, the user means include data input devices 32 and displays 34. The user means are preferably interconnected with the processor means 24. They permit the user to enter indicia, such as alphanumeric and other symbols, to select individual tools or kits to be dispensed. Such data input devices include, by way of example and not limitation, an optical scanner 32*a*, such as a bar code scanner which reads bar codes on cards, job orders or the like issued to employees, as well as bar codes on tools, supplies and the like; a magnetic card reader (not shown) which reads cards issued to employees; a touch pad 32*b*; a keyboard 32*c*; and a touch-sensitive screen (not shown), singly or in combination. An optical scanner 32*a* is preferred. The scanner 32*a* may include a slot for insertion of a card, as shown. The scanner 32*a* may alternatively be a hand-held unit (not shown), or may be positioned to scan outward (not shown) to permit the user to scan bar codes on other documents and objects. Preferably, the user means further includes one or more displays 34, such as an electronic digital display 34*a* or a display monitor 34*c*, to provide interactive instructions to the user, and a static menu display 34*b* or display monitor 34*c* which lists the tools, kits and supplies available in the automatic tool dispenser 22. The static menu display 34*b* can identify the various items available in the automatic tool dispenser 22 with numbers, alphanumeric indicia, descriptions, icons and the like. The automatic tool dispenser 22 further preferably includes a means for timing (not shown), such as an electronic clock and calendar, to provide time and date data to correlate with other activities related thereto.

As further shown in FIG. 2, the automatic tool dispenser 22 of the present invention is adaptable to also serve as an automatic tool dispenser add-on module 22*b* to a primary automatic tool dispenser 22*a*. When so used, the automatic tool dispensers 22*a* and 22*b* are interconnected by cable means for connecting 36, and the add-on module 22*b* is preferably operated from the user means located on the primary automatic tool dispenser 22*a*, as shown. This avoids the need for multiple connections to the processor means 24. Use of an add-on module 22*b* allows one to simply increase the capacity to supply a greater variety or number of tools at a single location.

Figure 3:
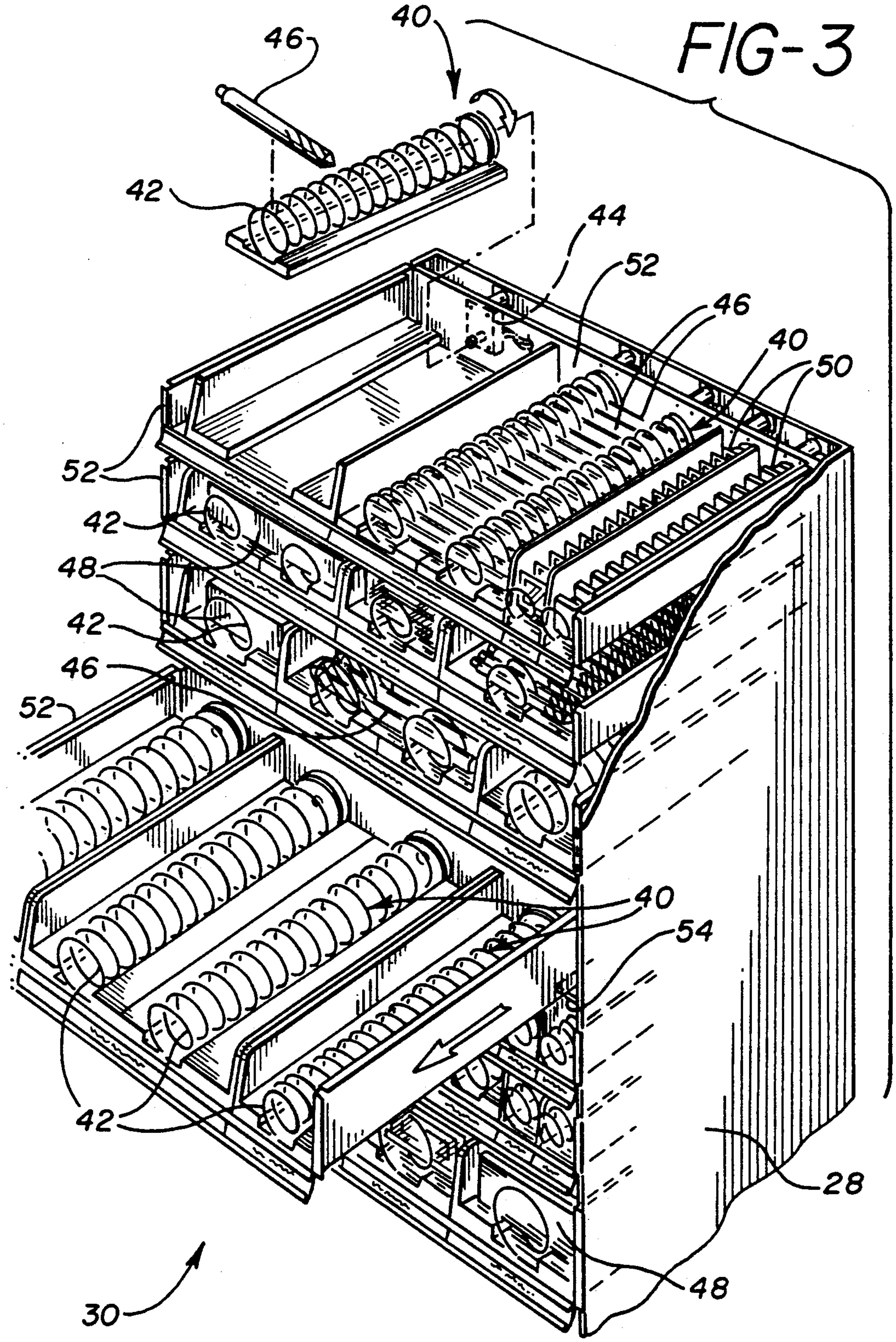
FIG. 3 is a schematic perspective view of helical coil delivery devices used as means for delivering tools in one type of automatic tool dispenser, showing removable drawers including helical coil delivery devices stocked with tools and related supplies.
Figure 4:
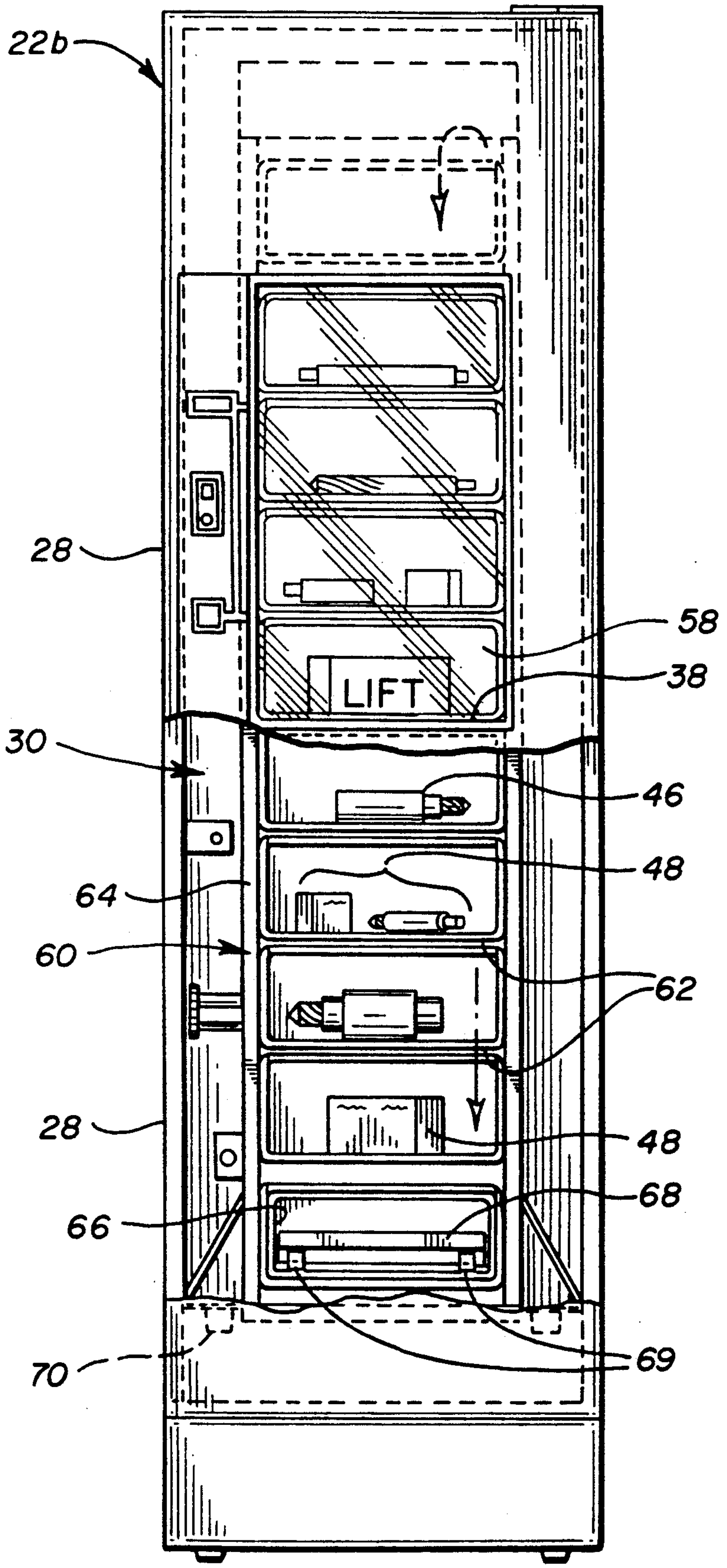
FIG. 4 is a schematic front elevational view of a robotic delivery system used as means for delivering tools in the automatic tool dispenser of the present invention, shown as the add-on module in FIG. 2.
Figure 5:
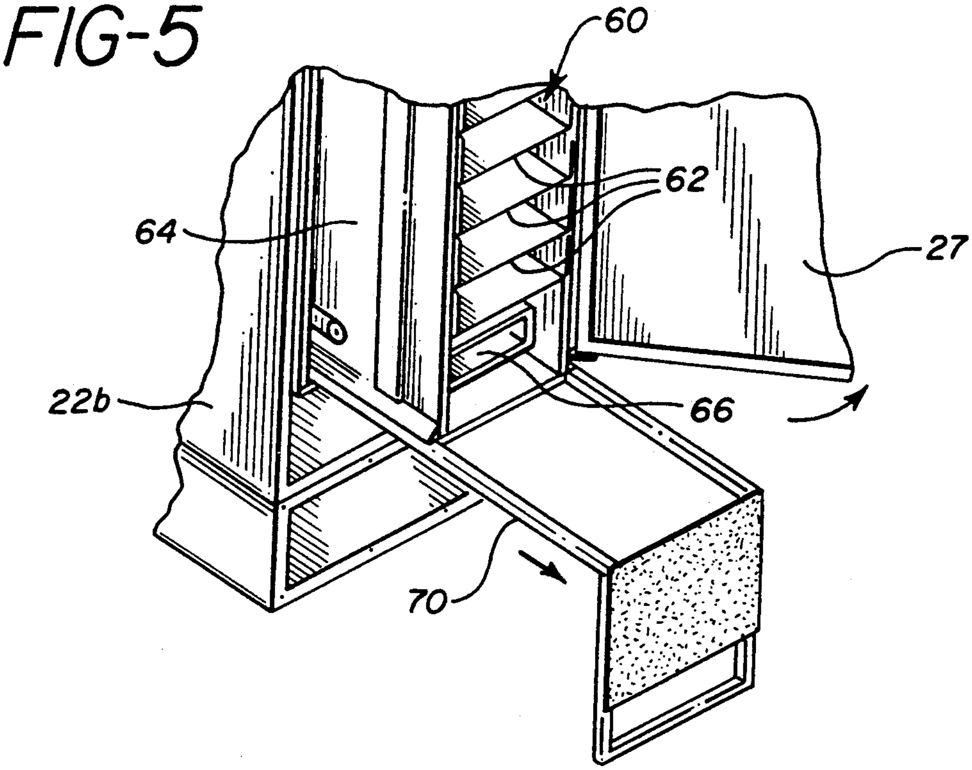
FIG. 5 is a schematic perspective view of the robotic delivery system of FIG. 4 partially removed from the housing of the automatic tool dispenser.
Figure 6:
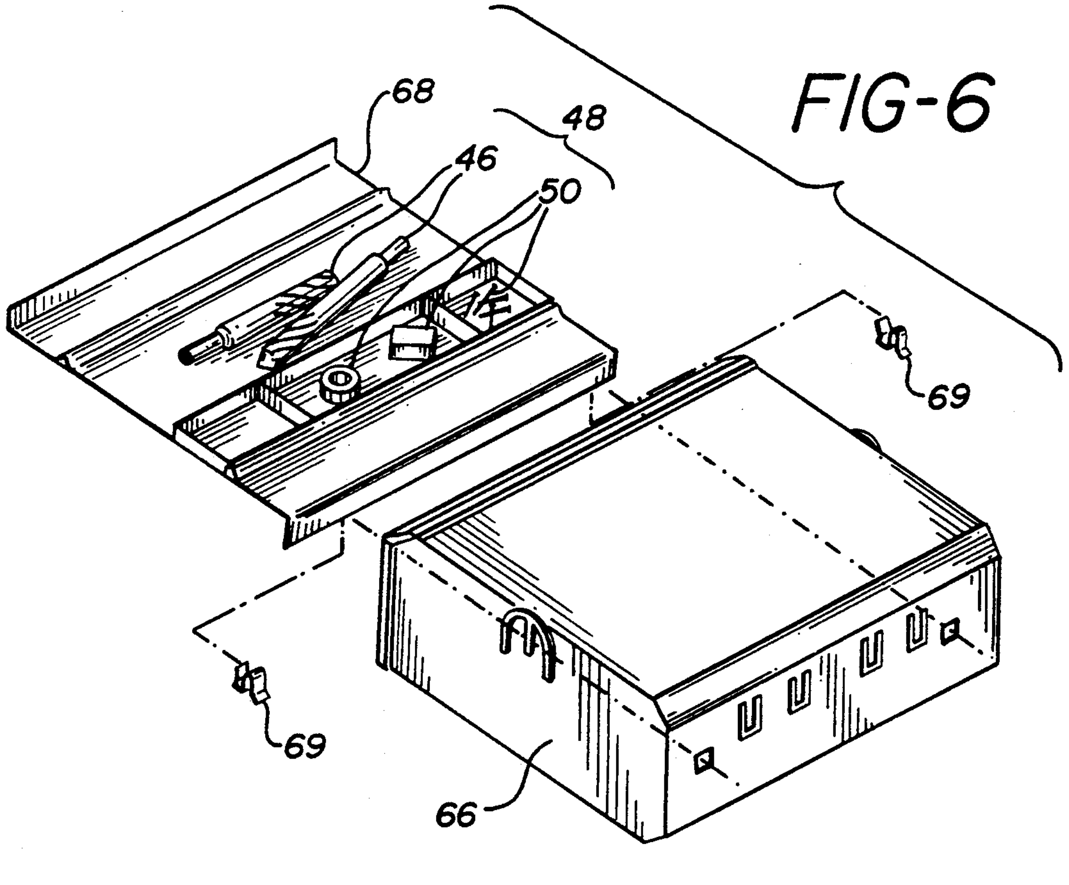
FIG. 6 is a schematic perspective view of a bucket and insert used in the robotic delivery system.

Referring now to FIGS. 3–6, the means for delivering 30 tools may be of several types. Helical coil delivery devices 40 are shown in FIG. 3, while a robotic delivery system 60 is shown in FIGS. 4–6. As shown in FIG. 3, helical coil delivery devices 40 include helical coils or helixes 42 which are rotated by motors 44 to deliver tools 46, kits 48 or related supplies 50 to a point of delivery near a delivery aperture 38. While FIG. 3 shows a single motor 44 for each helix 42, a plurality of helixes 42 could be interconnected for operation by a single motor 44 to deliver a tool 46 or kit 48 (or related supplies 50). Rotation of the helixes 42 repositions the tools 46 nested therein including, of course, the tool 46 which is dispensed by the rotation. As shown in FIG. 3, a plurality of helixes 42 are, preferably, removably disposed side by side on a drawer 52, where the separation between helixes 42 can be varied by removing intermediate ones thereof. The helical coil delivery devices 40 are thereby adjustable to receive tools 46 of different sizes, and one, two or more helixes 42 may be devoted to individual tools 46. As shown in FIG. 3, helixes 42 may be of different diameters and may have different spacing between adjacent loops thereof, as required to receive tools of different sizes. As also shown in FIG. 3, a plurality of drawers 52 are slidably inserted on supports 54 into the housing 28. The spacing between the drawers 52 may also be varied to adjust the means for delivering 30 to accommodate tools 46 of various sizes. Restocking is facilitated by sliding out drawers 52 to improve access to helixes 42, as shown in FIG. 3. The automatic tool dispenser 22 including helical coil delivery devices 40 may be based upon a model 5645 available from Electronic Merchandising Systems, Inc. of Cincinnati, Oh. As adapted for use in accordance with the present invention, the automatic tool dispenser may hold as many as 50 different tools 46 and related supplies 50. The helixes 42 can hold as many as 8 each of the largest items and 20 items each of smaller items.

As shown in FIGS. 4–6, the means for delivering 30 may also include a robotic delivery system 60. A robotic delivery system 60 is provided for tools whose size and/or shape are beyond the limits of helical coil delivery devices, or which require delivery without dropping. As shown in FIG. 4, a plurality of trays 62 are disposed on a rotating support system 64, such as a gear and chain system, and rotate in a loop to align the trays 62 and tools 46 or kits 48 disposed thereon with a delivery aperture 38. Shown in FIGS. 4 and 6, the robotic delivery system 60 further includes a plurality of buckets 66 which may be removably disposed on trays 62. The buckets 66 may be preloaded for restocking the automatic tool dispenser, minimizing down-time of the automatic tool dispenser 22. As well, inserts 68 may be provided to permit assembling kits 48 or retaining loose tools 46, parts or supplies 50, which might tend to roll out of the buckets 66 during operation of the rotating support system 64. Insert 68 could, thus, be attached by clips 69 to remain in the buckets 66, or may be removable to retain tools 46, parts or related supplies 50 dispensed thereon, while they are used during performance of an operation. As shown in FIGS. 5 and 6, restocking is facilitated by preferably including an extendable track 70 on which at least a portion of the rotating support system 64 including trays 62 may be slidably removed from the housing 28 to improve access to trays 62, buckets 66, or inserts 68 for restocking. The automatic tool dispenser 22 including a robotic delivery system 60 may be based upon a model 3007 cold food merchandiser available from Electronic Merchandizing Systems, Inc. of Cincinnati, Oh. As adapted for use in accordance with the present invention, the automatic tool dispenser 22 accommodates a minimum of 15 items and a maximum of 30 items on the robotic delivery system 60.

Referring again to FIG. 2, the automatic tool dispensers 22 are operable by entering alphanumeric symbols or other indicia with the data input devices 32 and displays 34. User identifying indicia, security codes, such as personal identification numbers, indicia related to tools 46, kits 48 of tools and related supplies 50, or indicia related to operations to be performed, machine to be used, equipment to be operated, shift, time of day, department, job, project, work order, or the like, may be entered to select tools or kits. The processor means 24 can receive, process and store the indicia entered at each automatic tool dispenser 22 and control the operation of the automatic tool dispenser 22. The entry of such indicia produces data which may be used for tracking, inventory and improved distribution. For example, tool use data may be linked to departments, jobs, machines, shifts, time, dates, users, automatic tool dispensers 22, and other data.

Various features can also be added through the processor means 24 to protect and limit tool and kit distribution. Security features can be added to lock out the system 20 from unauthorized users. For example, as a security feature, the delivery of tools 46 and kits 48 can be keyed to user identification or security codes. Other preference or usage features can be added to restrict distribution to authorized users, limiting delivery of tools 46 or kits 48 based on data present in the processor means 24, or based on programmed limitations. By way of example and not limitation, dispensing of tools 46 and kits 48 may be limited by the level of prior tool usage over a given period by the particular user, may be limited to dispensing a given number of tools to an individual user, to a group of users, or for a particular operation in a specific time period, or may be limited upon reaching a level of tools 46 or kits 48 in inventory which must be preserved for use by later shifts. Further, a tool or kit request may be limited by a programmed, user-oriented limit allowing a user access to only specific tools 46 or kits 48, or by a programmed, operation-oriented limit allowing only specific tools 46 or kits 48 to be selected for an identified operation or machine. As well, the sequence of tools 46 or kits 48 disposed in the robotic delivery system 60 may be controlled to provide preferential distribution. For example, used tools may be required to be dispensed first. An override code is preferably also provided for identified users, such as foremen, where such limits are imposed, to accommodate the need for valid, but unusual requests, or higher than expected use rates.

Various other features can also be added through the processor means 24 to permit enhanced cost accounting, servicing or restocking. The cost of each item stored in the automatic tool dispenser 22 may be input with an input device 32, such as keyboard 32*c*. The system 20, and in particular, the processor means 24, may then be used to track costs related to usage of tools 46, kits 48, and supplies 50 by user, operation, department, job, machine and the like, over any period such as a shift, day, week, month or other time period. Preferably, the system 20 further includes means for reporting the cost, usage and inventory data for each automatic tool dispenser 22, which further preferably has the capability to compare inventory data with pre-determined inventory levels to determine the number of items needed to replenish inventory of available items to a preset level. The means for reporting preferably includes software (not shown) and the printer 33 in processor means 24, which together produce a restocking report. A modem 35 may also be included in processor means 24 to permit transmission of data from system 20 to a remote location. A data transmission capability enables parties, such as in-house or third party maintenance organizations and tool suppliers, to receive data directly from the system 20. Such data may be used to indicate the need for scheduled or unscheduled servicing, or may be used to allow inventory levels of tools 46, kits 48 and supplies 50 to be checked in the automatic tool dispensers 22 for restocking. Purchase orders may be created electronically from transmitted data. As well, suppliers can provide inventory for the automatic tool dispensers on consignment, and invoice the system owner or user as tools 46 or supplies 48 are withdrawn.

Referring to FIGS. 1 and 2, the system 20 of the present invention provides for the automatic tool dispensers 22 to be operated in a servicing or restocking mode. As shown in FIG. 2, each housing 28 includes a housing door 27, and a housing door lock 29. Housing door lock 29 is preferably operable for servicing and restocking only upon entry of authorized user identifying indicia, or a separate authorization code. In the servicing or restocking mode, upon operation of housing door lock 29, the processor means 24 also preferably records the identity of the individual user who is servicing or restocking, and the date and time of unlocking and locking the housing door 27. Alternatively, the housing door 27 includes a switch (not shown) which operates when the door is opened and shut to provide data on the time and date of such access.

To facilitate servicing, the system 20 and/or the automatic tool dispenser 22 preferably include automatic means for diagnosing (not shown) the operational status of the automatic tool dispenser 22 and components thereof. The automatic means for diagnosing may include software routines and/or hardware, as needed to diagnose the operation of components, such as the various means for delivering 30.

To facilitate restocking and servicing the user means for entering data remain operable in the servicing and restocking mode. Thus, after gaining access to housing 28 for restocking, the various input devices 32, located at the housing or remote therefrom, may be used to enter indicia related to tools 46, parts or supplies 50, and record additions or deletions made during servicing. For example, a touch screen (not shown), scanner **32*a*, touch pad 32*b*, a keyboard 32*c*, or combinations of thereof, may be used to record the identity items added or deleted from the automatic tool dispenser 22**. The identity, quantity, and condition of items added in the inventory of the automatic tool dispenser may also be so recorded.

With reference to FIGS. 2 and 3, operation of the means for delivering will be described. Upon entry of the appropriate codes to selectively operate the means for delivering 30, where helical coil delivery devices 40 are used, the helixes 42 rotate to dispense one or more tools 46, kits 48 or related supplies 50 to a dispensing bin 56, accessible through delivery aperture 38. Dispensed items typically drop from helixes 42 to dispensing bin 56. A door 58 covers delivery aperture 38. Preferably, as a further safety feature, a switch (not shown) is provided which disables further operation of the means for delivering upon opening of the door 58, thereby discouraging tampering and pilfering. Further reference is now made to FIGS. 2 and 4, where like elements represent like numbers. Where the means for delivering 30 includes a robotic delivery system 60, selection of a tool 46 or kit 48 causes the rotating support system 64 to operate and position the chosen item(s) at the delivery aperture 38. The tray 62 is accessible directly through the delivery aperture 38 so that the items therein are dispensed without dropping. A bucket 66 and insert 68 disposed on the tray 62 may also be accessed therethrough, and removed if so provided. The delivery aperture 38 also includes a door 58, including a switch (not shown) to secure the robotic delivery system 60 against further operation once the door 58 is opened. The door 58 may further include a lock (not shown) which is activated to allow the door 58 to open when an authorized selection is made.

The automatic tool dispensers 22 of the present invention may also include means for returning 72 tools. Referring to FIGS. 2 and 4, the means for returning 72 tools could be an add-on module **22*b*, empty and ready to receive tools. The means for returning is preferably accessible only upon entry of identifying indicia at the user means for entering data, to permit tracking and control of tools, operations and users. So used, the processor means 24 could require the entry of user identifying indicia, indicia related to the tool item number, indicia indicating estimated tool condition, indicia related to the operation in which used, the machine on which used, the job for which used, or other indicia as noted above, separately or in some combination, to allow operation of the door 58. Thus, for example, where a scanner 32*a* is used, as is preferred, user identifying indicia may be readily entered via a bar code label on an employee card, and indicia related to the tool item number may be entered by scanning a bar code label on the returned tool or part. Other indicia could be added at touch pad 34*a* or by scanning other bar coded slips. Separate trays 62 of the robotic delivery system 60** could be used by different users to return identified tools, or could be designated for the return of specific types of tools, or kits.

Alternatively, the means for returning 72 could be combined with the means for delivering 40, 60, as representatively shown in FIG. 2. As shown, portions of automatic tool dispenser 22, may be dedicated for returning tools. That is, empty trays 62 in an add-on module **22*b*, may be reserved for returning tools, or may be used after dispensing tools 46, to receive used tools 46. Or, a return bin 78 may be provided in the housing 28 of automatic tool dispenser 22*a* (as shown) or in the housing 28 of an add-on module 22*b* (not shown), to receive used tools through a return aperture 74 and return door 76. Return door 76 is, preferably, operable by the user by entering indicia at the user means for entering data, as described above. In a further alternative, means for returning 72 may comprise a separate return bin 78 which is a stand-alone unit (not shown), to receive used tools through return aperture 74 and return door 76. The separate return bin 78** could also be connected to the user means for entering data to require entry of indicia by the user to operate return door 76, as described above.

Regardless of the particular means for returning 72 used, the return of used or worn-out tools thereto enhances the tracking and control of tools and kits 46, permits recycling of worn-out tools, and allows re-use of used tools by others, further reducing manufacturing costs. The means for returning 72 may, as well, enhance the efficiency with which old, obsolete tools may be retired and new tools introduced. Users who convert from old to new tools can be easily identified, and those failing to do so can be reminded.

In accordance with the present invention, a method for dispensing tools is provided. The method includes the first step of providing a system 20 including one or more automatic tool dispensers 22, each of which includes a housing 28 with means for delivering 30 tools therein, and a means for controlling operation including processor means 24 and user means for entering data disposed, at least in part, in the housing 28. The method includes the further steps of initially defining with indicia separate item numbers and descriptions related to tools 46 disposed in each housing 28, initially defining with indicia separate item numbers and description related to one or more kits 48, initially entering and storing the indicia in the processor means 24, and then selectively operating means for delivering 30 to deliver one or more tools 46 or kits 48 by entering indicia related thereto on the user means for entering data. It is understood that the step of initially defining item numbers and descriptions may include defining item numbers and descriptions for related supplies 50 dispensed with or separately from tools 46 and kits 48. It is also understood that related supplies 50 may be materials or parts.

The step of selectively operating the means for delivering 30 may be accomplished by entering indicia related to a kit 48, a tool 46 or related supplies 50.

To incorporate certain security features into the method of the present invention, the method for dispensing tools may further include the steps of initially defining with user identifying indicia personal identification numbers as a security code related to individual users of the, initially defining at least one group of those personal identification numbers as authorized security codes for authorized users, and entering and storing the user identifying indicia in the processor means 24. So that a security feature is provided, prior to selectively operating the means for delivering 30, it is necessary to perform the further step of entering user identifying indicia related to an individual user to authorize selective operation thereof.

To provide another way to obtain access relevant tools, limit the scope of authorized tools, provide additional data for control, tracking and inventory, as well as other similar purposes, the method for dispensing tools may further include the steps of initially defining with indicia operation numbers for separate operations which are performed by users with one or more tools 46 or kits 48 disposed in the automatic tool dispenser 22, initially defining with item numbers and descriptions the identities and the quantities of tools 46 and kits 48 which are related to performing the separate operations, entering and storing the item numbers and descriptions in the processor means. Alternatively, the step of defining may include initially defining with indicia equipment to be operated, departments performing the work, jobs, projects or work orders, and the identities and quantities of tools 46, kits 48 and supplies 50 related thereto. So that one or all of the related objectives (such as control, tracking and inventory) noted above are achieved, prior to the step of selectively operating the means for delivering 30, it is necessary to perform the further step of entering indicia related to at least one of the operations (or alternatively indicia related to equipment to be operated, departments, jobs, projects and/or work orders, or the like) to identify and quantify tools and kits which may be delivered by selective operation of said means for delivering.

To provide a way to limit the use of tools to a particular individual, the method for dispensing tools may further include the step of defining limits to the number of particular tools 46 or kits 48 which may be dispensed to an individual user or a group of users over a given time period, or dispensed for use in a defined operation, job, project or work order during a given time period. This step limits the number of times the step of selectively operating may be performed by a user or group of users during a given time period, such as a shift, day, week or the like. Individual user limits discouraging pilfering and premature disposal of used, perishable tools. Group limits also discourage pilfering and further provide one means for retaining a predetermined inventory of tools in reserve in the automatic tool dispenser for a later shift. Operation limits provide control over tools in a different manner, and may be desired, for example, to limit distribution to a particular user over a period of time when the user is performing a particular operation, or to limit distribution completely when a particular operation is shut down, or to redefine the list of authorized tools for a user when assigned operations are changed.

To provide for a certain predetermined order of distribution, for example to require dispensing of used tools before new tools, the method may further include, prior to the step of selectively operating, the step of defining the order in which ones of items or kits are to be dispensed by the step of selectively operating.

Inventory control is provided by the method of the present invention by providing that the processor means 24 includes means for reporting the inventory of tools 46 and kits 48 in automatic tool dispensers 22 in the system, and including the step of reporting inventory in said automatic tool dispenser 22. This step of reporting inventory may further include listing, for each automatic tool dispenser 22, indicia related to the identity of tools 46 initially disposed in each of said automatic tool dispensers 22 and the quantity remaining therein, and also listing, for each tool 46 initially disposed in the automatic tool dispensers 22, indicia identifying the automatic tool dispenser 22 and quantity of tools 46 remaining in each of the automatic tool dispensers 22. The step of reporting inventory may further include the steps of comparing the inventory of tools 46 and supplies 50 in each automatic tool dispenser 22 with pre-set levels, and transmitting data to a remote location to permit in-house or third party maintenance organizations or tool suppliers to receive data directly. The step of reporting may still further include the step of automatically creating purchase orders from transmitted data.

The method of the present invention may further provide for the return of used or worn-out tools, whether originally dispensed separately or in kits 48. To achieve this end, an automatic tool dispenser 22, such as an associated add-on module 22*b*, may be provided which serves, at least in part, as a means for returning 72 tools. Alternatively, automatic tool dispenser 22 includes means for returning 72 tools, wherein tools 46 may be disposed after use. A separate stand-alone unit may also be provided as means for returning 72 tools. This further aspect of the method provides for enhanced inventory control, reuse of partially worn tools, and recycling of worn-out tools. The method may include the steps of initially defining with indicia separate item numbers and descriptions related to tools 46 and kits 48 to be returned to the means for returning 72, initially entering and storing the indicia in the processor means 24, and entering the indicia into the processor means 24 upon the return of a tool 46 or kit 48 thereto by the user. Preferably, the means for returning 72 is provided with a return aperture 74 and a return door 76, and means for locking, operable only upon entry of indicia to require entry of data desired to enhance inventory control, tracking, and accountability. The indicia required to operate the return door 76 could be, singly or in combination, user identifying indicia, indicia related to the identity and quantity of the tools returned, indicia related to an operation for which the tools were used, or other pertinent data. Effective inventory control, tracking and use data result, as well as complete tool usage, increasing productivity and reducing overall manufacturing costs.

Figure 7:
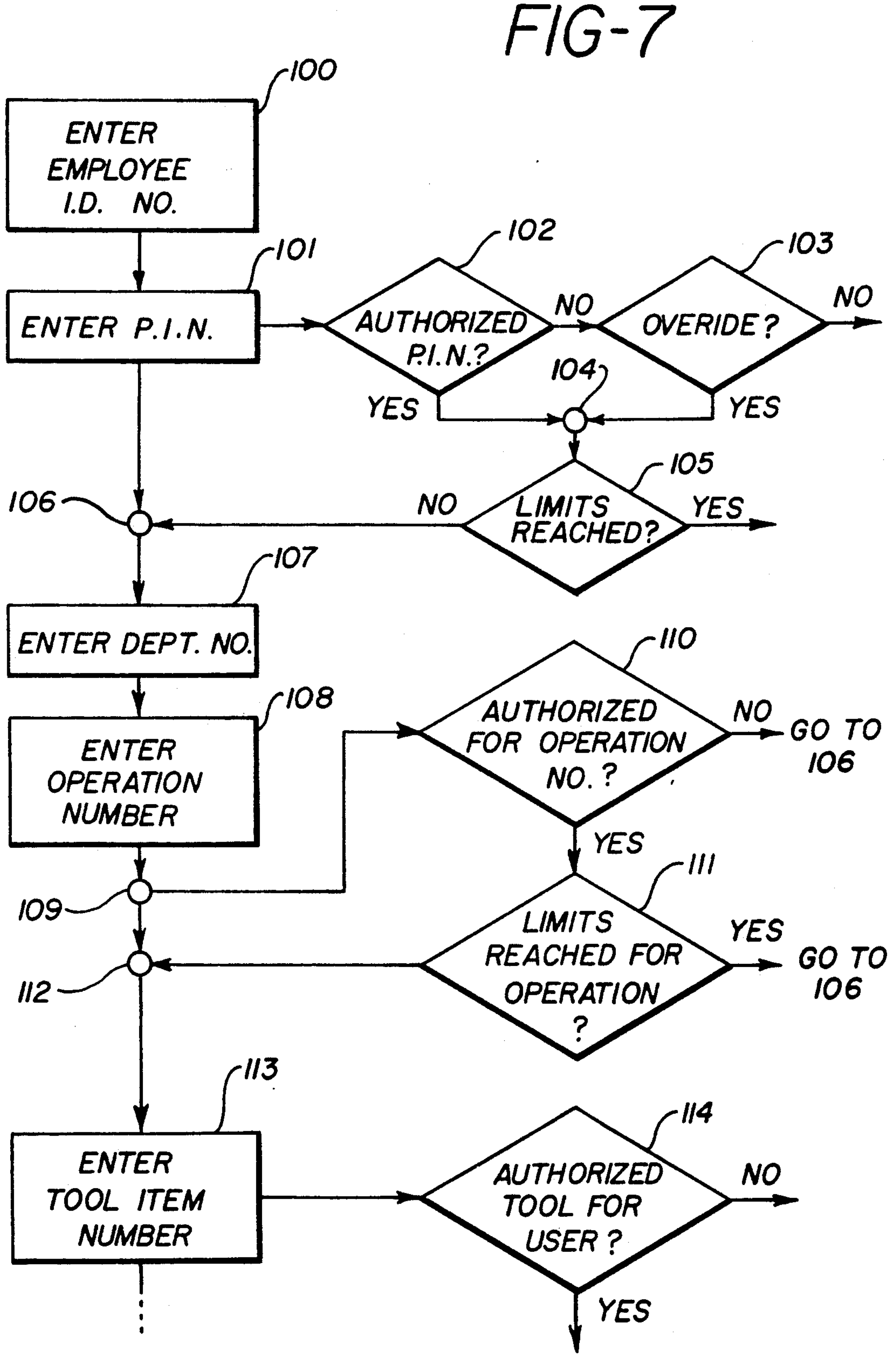
FIG. 7 is a representative flow diagram of the method of the present invention.

In accordance with the present invention, the steps of the method may be performed in many ways, in many different sequences, within the scope of the parameters disclosed. FIG. 7 is exemplary of the method in this regard, and the sequence of steps 100-114, set forth therein, may be performed and in many different ways to operate the automatic tool dispenser.

While certain representative embodiments and details have been shown for purposes of illustrating the invention, it will be apparent to those skilled in the art that various changes in the apparatus, method and article disclosed herein may be made without departing from the scope of the invention, which is defined in the appended claims.

What is claimed is:

1. A system for dispensing tools for industrial, manufacturing, construction, maintenance or like operations, said system comprising:

one or more automatic tool dispensers, each of said one or more automatic tool dispensers having a housing;

means for delivering comprising a plurality of separate delivery devices each operable to receive at least one of a plurality of different tools, said means for delivering disposed in each of said housings; and means for controlling operation of said means for delivering, wherein at least a portion of said means for controlling is disposed in at least one of said housings, said means for controlling including:

at least one user means for entering data operatively connected to simultaneously operate a plurality of said separate delivery devices to deliver a plurality of different tools as a kit; and processor means for automatically operating said means for delivering, wherein:

said processor means is adapted to receive and automatically respond to data from one or more of said user means for entering data to simultaneously operate a plurality of said separate delivery devices; and and processor means automatically limits the operation of said means for delivering to authorized users identified by said user means for entering data.

2. The system of claim 1 wherein said processor means is adapted to receive indicia identifying a specific task and respond thereto to automatically and simultaneously operate a plurality of said separate delivery devices to deliver a plurality of tools from said separate delivery devices as a kit.

3. The system of claim 1 wherein said user means comprises a touch pad.

4. The system of claim 1 wherein said means for delivering includes means for adjusting the position of said means for delivering to accommodate tools of different sizes.

5. The system of claim 1 wherein said means for delivering comprises at least one helical coil delivery device, each of said helical coil delivery devices including:

a helical coil having a plurality of adjacent loops adapted to receive at least a portion of a tool therebetween; and means for rotating said helical coil to reposition a tool disposed between adjacent loops thereof.

6. The system of claim 5 wherein said means for delivering comprises at least two of said helical coil delivery devices, each of said helical coils adapted to receive at least a portion of the same tool therein, said at least two helical coils rotated in cooperation by their respective means for rotating to reposition a tool disposed therein.

7. The system of claim 5 wherein:

said means for delivering comprises a plurality of said helical coil delivery devices;

said helical coils are removably disposed in said housing on a plurality of slidably removable drawers; and said housing includes a plurality of supporting elements to slidably receive said drawers;

whereby one or more of said helical coils may be removed from said drawer and larger tools may be received in said helical coils remaining on said drawers; and whereby said drawers may be raised or lowered in position to adjust the vertical separation between said drawers, and larger tools may be received in said helical coils.

8. The system of claim 5 further comprising means for returning tools including means for rotating said helical coil so as to receive a tool returned between adjacent loops thereof, and wherein said processor means is operable to receive data regarding returned tools from said user means for entering data.

9. The system of claim 1 wherein said means for delivering includes:

a delivery aperture defined in said housing; and a robotic delivery device comprising:

a plurality of trays each adapted to receive at least one tool thereon; and means for aligning ones said plurality of trays with said delivery aperture;

whereby at least one tool may be dispensed without dropping from one or more of said trays through said delivery aperture.

10. The system of claim 9 further comprising means for returning tools, wherein:

at least a portion of at least one of said robotic delivery devices is positionable to receive on said trays thereof one or more tools returned from users; and said processor means is operable to receive data regarding returned tools from said user means for entering data.

11. The system of claim 10 wherein said processor means automatically operates said means for delivering in a specific sequence to deliver new and returned tools disposed therein in a predetermined order.

12. The system of claim 1 wherein:

at least one of said automatic tool dispensers includes means for delivering comprising at least one helical coil delivery device; and at least one of said automatic tool dispensers includes means for delivering comprising at least one robotic delivery device.

13. The system of claim 1 wherein:

said means for delivering includes:

a delivery aperture defined in said housing;

a delivery door for substantially opening and closing access to said delivery aperture; and said means for controlling includes means for disabling the operation of said means for delivering upon opening of said delivery door.

14. The system of claim 1 wherein said user means for entering data comprises:

a digital display to convey operating instructions to a user;

an optical scanner to input user identifying indicia from a bar code scanned by said scanner;

a touch pad to input indicia, whereby indicia related to tools to be dispensed and user identifying indicia may be input to select at least one tool for delivery; and whereby one or more means for delivering may be selectively operated; and a display card to list indicia related to tools to be dispensed.

15. The system of claim 1 wherein said processor means automatically limits the operation of said means for delivering to dispense a limited number of tools to an identified group having a plurality of authorized users in a predetermined time period.

16. The system of claim 1 wherein said processor means automatically limits the operation of said means for delivering to dispense a specific number of tools during a predetermined time period to authorized users engaged in an identified task.

17. The system of claim 16 wherein:

said processor means further includes:

means for computing the inventory of items present in said means for delivering; and means for measuring the time of day; and said processor means automatically limits the operation of said means for delivering in a first time period to retain one or more tools present in said means for delivering for later use during a second time period.

18. The system of claim 1 wherein:

each of said automatic tool dispensers include means for locking said housing to restrict access to authorized users; and said processor means automatically releases said means for locking one or more of said automatic tool dispensers upon entry of user identifying data related to an authorized user at a user means for entering data which is related to said one or more automatic tool dispensers;

whereby access to said housing for restocking and inventory control may be restricted to authorized users.

19. The system of claim 18 wherein said processor means further includes means for receiving and storing inventory data related to tools disposed in ones of said one or more automatic tool dispensers.

20. The system of claim 1 wherein said processor means includes a microprocessor disposed in said housing.

21. The system of claim 1 wherein said processor means for includes a computer.

22. The system of claim 1 wherein said means for controlling further comprises processor means for rectifying, processing and storing data related to said one or more automatic tool dispensers, said data including data related to one or more of tool inventory data, user identification data, point of use data, automatic tool dispenser location data, and time and date data, whereby tools dispensed from said one or more automatic tool dispensers may be tracked and accounted for.

23. A system for dispensing tools for industrial, manufacturing, construction, maintenance or like operations, said system comprising:

one or more automatic tool dispensers, each of said one or more automatic tool dispensers having ah housing;

means for delivering one or more of a plurality of tools, said means for delivering disposed in each said housing; and means for controlling operation of said means for delivering, wherein at least a portion of said means for controlling is disposed in at least one said housing, said means for controlling including:

at least one user means for entering data; and processor means for automatically operating said means for delivering, wherein said processor means is adapted to receive and respond to data from one or more of said user means for entering data, and said processor means automatically limits the operation of said means for delivering to authorized users identified by said user means for entering data; and wherein one or more of said automatic tool dispensers includes means for returning tools thereto, said means for returning tools comprising:

a return aperture defined in said housing;

a return door for substantially opening and closing access to said return aperture;

a return bin disposed in said housing positioned to receive tools entering said housing through said return aperture; and wherein:

said means for controlling includes means for locking said return door;

said user means for entering data is adapted to receive indicia to unlock said return door; and said processor means is adapted to receive data regarding returned tools from said user means for entering data;

whereby a user may return one or more tools to said return bin.

24. A method for dispensing tools for use in industrial, manufacturing, construction or maintenance operations, said method comprising:

providing a system including one or more automatic tool dispensers, each of said one or more automatic tool dispensers having: a housing; means for delivering one or more of a plurality of tools, said means for delivering disposed in at least one of said housings; and means for controlling operation of said means for delivering, at least a portion of said means for controlling disposed in said housing; and wherein said means for controlling further includes: processor means for automatically operating said means for delivering; and user means for entering data;

initially defining with indicia separate item numbers and descriptions related to tools disposed in one or more of said housings, and initially defining with indicia separate item numbers and description related to one or more kits comprised of a plurality of tools; and initially entering and storing said indicia in said processor means;

selectively operating said system by entering indicia related to at least one said kit at said user means for entering data to automatically operate a plurality of said means for delivering to deliver a plurality of tools in said kit; and substantially simultaneously dispensing a plurality of tools to the user.

25. The method of claim 24 further comprising the steps of:

initially defining with user identifying indicia at least one personal identification number as a security code related to at least one individual user of said system;

initially defining at least one group of one or more personal identification numbers as authorized security codes for authorized users; and initially entering and storing said user identifying indicia in said processor means; and prior to said step of selectively operating, entering user identifying indicia related to an individual user to authorize selective operation of said means for delivering on one of said user means for entering data.

26. The method of claim 24 further comprising the steps of:

initially defining with indicia operation numbers related to separate operations performed by users with at least one kit disposed in said automatic tool dispenser;

initial defining the identities and quantities of kits related to said separate operations; and initially entering and storing said operation numbers and said identities and quantities of kits related to said separate operations in said processor means; and wherein said step of selectively operating said system by entering indicia related to at least one of said operations by which said processor means substantially identifies and quantifies the kits dispensed to the user.

27. The method of claim 24 further comprising, prior to the step of selectively operating, the step of defining limits to the number of one or more items or kits which may be dispensed to an individual user in a given time period whereby the step of selectively operating may be performed by ones of said users a limited number of times in said time period.

28. The method of claim 24 further comprising, prior to the step of selectively operating, the steps of:

defining a plurality of personal identification numbers to a plurality of individual users, respectively;

defining groups of two or more individual users having personal identification numbers; and defining limits to the total number of tools and kits which may be dispensed to all users of a group in a given time period; and entering and storing said personal identification numbers, groups, and limits in said processor means;

such that said step of selectively operating is repeatedly performable a limited number of times to dispense an automatically limited number of tools and kits to a defined group in said given time period.

29. The method of claim 24 further comprising, prior to the step of selectively operating, the step of defining limits to the total number of one or more items or kits which may be dispensed for use in a defined operation in a given time period, whereby the step of selectively operating may be performed with regard to ones of said operations a limited number of times in said time period.

30. The method of claim 24 further comprising, prior to the step of selectively operating, the steps of:

defining a sequence in which new and returned ones of said tools are dispensed during performance of said step of selectively operating; and entering said sequence in said processor means; and wherein said step of selectively operating automatically delivers new and returned tools disposed in said means for delivering in a predefined sequence.

31. The method of claim 24 wherein said processor means includes means for reporting inventory in said one or more automatic tool dispensers in said system, and said method further comprises the step of reporting inventory in said automatic tool dispenser.

32. The method of claim 31 wherein said step of reporting inventory includes the steps of:

listing for each automatic tool dispenser indicia related to the identity of tools initially disposed in each of said automatic tool dispensers and the quantity remaining therein, and listing for each tool initially disposed in one or more automatic tool dispensers, indicia identifying the automatic tool dispenser and quantity of tools remaining in each of said automatic tool dispensers; and transmitting said indicia related to the identity of tools initially disposed in each of said automatic tool dispensers, the quantities remaining therein, indicia identifying the automatic tool dispensers, and quantities of tools remaining in each of said automatic tool dispensers.

33. A method for dispensing and returning tools for use in industrial, manufacturing, construction or maintenance operations, said method comprising:

providing a system including:

one or more automatic tool dispensers, each of said ones or more automatic toll dispensers having a housing;

means for delivering one or more of a plurality of tools, said means for delivering disposed in at least one of said housing;

means for controlling operation of said means for delivering, at least a portion of said means for controlling disposed in one said housing, said means for controlling including:

at least one user means for entering data;

processor means for automatically operating said means for delivering wherein said processor means is adapted to receive and respond to data from one or more of said user means for entering data, and said processor means automatically limits the operation of said means for delivering to authorized users identified by said user means for entering data; and wherein one or more of said automatic tool dispensers includes means for returning tools thereto, said means for returning including a return aperture defined in said housing, a return door for substantially opening and closing access to said return aperture, and a receiving means positioned to receive tools entering said housing through said return aperture; and wherein said means for controlling includes means for locking said return door, and said user means for entering data is adapted to receive indicia to unlock said return door, and said processor means is adapted to receive data regarding returned tools from said user means for entering data;

initially defining with indicia separate item numbers and descriptions related to one or more tools disposed in one or more of said housings;

initially entering and storing said indicia in said processor means;

selectively operating said system by entering indicia related to at least one of said tools at said user means for entering data to automatically operate one or more of said means for delivering and deliver one or more tools;

dispensing one or more tools to the user; and returning one or more tools to at least one of said automatic tool dispensers after use of said one or more tools, said step of returning including the steps of:

entering indicia at said user means for entering data to unlock said return door; and entering indicia related to said one or more tools being returned into said processor means using said user means for entering data; and returning said one or more tools through said return door and return aperture to said receiving means.

* * * * *

UNITED STATES PATENT AND TRADEMARK OFFICE

CERTIFICATE OF CORRECTION

PATENT NO. : 5,205,436

DATED : April 27, 1993

INVENTOR(S) : Kent V. Savage

It is certified that error appears in the above-identified patent and that said Letters Patent is hereby corrected as shown below:

On the title page, Item [54] and Column 1, line 2, MAINE TOOL DISPENSING DEVICE AND SYSTEM" should read MACHINE TOOL DISPENSING DEVICE AND SYSTEM--.

Col. 12, line 1, "and processor means" should read --said processor means--.

Col. 14, line 14, "means for includes" should read --means includes--.

Col. 14, lines 16 and 17, "means for rectifying," should read --means for receiving--.

Col. 14, line 28, "having ah" should read --having a--.

Col. 16, line 58, "ones or more" should read --one or more--.

Signed and Sealed this

First Day of March, 1994

Attest:

Bruce Lehman

BRUCE LEHMAN

*Attesting Officer* *Commissioner of Patents and Trademarks*